US006128545A

United States Patent [19]
Miller

[11] Patent Number: 6,128,545
[45] Date of Patent: Oct. 3, 2000

[54] AUTOMATED APPARATUS AND METHOD OF GENERATING NATIVE CODE FOR A STITCHING MACHINE

[75] Inventor: Jeffrey L. Miller, Hermosa Beach, Calif.

[73] Assignee: McDonnell Douglas Corporation, Saint Louis, Mo.

[21] Appl. No.: 08/995,840

[22] Filed: Dec. 22, 1997

[51] Int. Cl.[7] .................................................. G06F 7/66
[52] U.S. Cl. .......................... 700/137; 700/130; 244/123; 244/133
[58] Field of Search ................................... 700/137, 133, 700/136, 138, 183, 96, 64, 130; 112/470.04; 244/123, 133

[56] References Cited

U.S. PATENT DOCUMENTS

| | | | |
|---|---|---|---|
| 3,312,184 | 4/1967 | Cash | 112/118 |
| 3,515,080 | 6/1970 | Ramsey | 112/470.13 |
| 4,067,276 | 1/1978 | Mohilo et al. | 112/220 |
| 4,092,938 | 6/1978 | Coughenour et al. | 112/457 |
| 4,104,976 | 8/1978 | Landau, Jr. et al. | 112/470.02 |
| 4,285,293 | 8/1981 | Martling | 112/281 |
| 4,331,091 | 5/1982 | Parker et al. | 112/475.08 |
| 4,429,364 | 1/1984 | Maruyama et al. | 700/137 |
| 4,446,520 | 5/1984 | Shigeta et al. | 700/137 |
| 4,481,507 | 11/1984 | Takuguchi et al. | 340/679 |
| 4,503,788 | 3/1985 | Giannuzzi et al. | 112/470.06 |
| 4,506,611 | 3/1985 | Parker et al. | 112/80.01 |
| 4,776,291 | 10/1988 | Tajima et al. | 112/98 |
| 4,786,343 | 11/1988 | Hertzbert | 156/93 |
| 4,798,152 | 1/1989 | Simons et al. | 112/470.05 |
| 4,815,404 | 3/1989 | Ellermann et al. | 112/470.01 |
| 4,843,986 | 7/1989 | Kozuka et al. | 112/163 |
| 4,873,931 | 10/1989 | Takagi et al. | 112/470.01 |
| 4,876,973 | 10/1989 | Marrache et al. | 112/470.13 |
| 4,899,287 | 2/1990 | Hulshoff et al. | 700/136 |
| 4,917,756 | 4/1990 | Cahuzac et al. | 156/429 |
| 4,992,317 | 2/1991 | Chess et al. | 428/102 |
| 5,218,916 | 6/1993 | Kurono et al. | 112/102.5 |
| 5,239,475 | 8/1993 | Shigeta et al. | 700/137 |
| 5,287,820 | 2/1994 | Stutznacker | 112/117 |
| 5,299,519 | 4/1994 | Hirabayashi | 112/456 |
| 5,341,755 | 8/1994 | Kawasaki | 112/163 |
| 5,379,226 | 1/1995 | Shigeta | 700/137 |
| 5,383,417 | 1/1995 | Norrid | 112/278 |
| 5,392,724 | 2/1995 | Kurono et al. | 112/102.5 |
| 5,473,535 | 12/1995 | Shigeta et al. | 700/86 |
| 5,474,001 | 12/1995 | Tajima et al. | 112/102.5 |
| 5,510,994 | 4/1996 | Tsonis et al. | 700/137 |
| 5,515,798 | 5/1996 | Cahuzac | 112/470.12 |
| 5,537,945 | 7/1996 | Sugihara et al. | 112/470.06 |
| 5,543,005 | 8/1996 | Monget et al. | 156/93 |

*Primary Examiner*—William Grant
*Assistant Examiner*—Paul Rodriguez
*Attorney, Agent, or Firm*—Westerlund & Powell, P.C.; Ramon R. Hoch; Robert A. Westerlund

[57] ABSTRACT

A computer system automatically generates CNC code for a stitching machine. The computer determines the locations of a present stitching point and a next stitching point. If a constraint is not found between the present stitching point and the next stitching point, the computer generates code for making a stitch at the next stitching point. If a constraint is found, the computer generates code for changing a condition (e.g., direction) of the stitching machine's stitching head.

22 Claims, 3 Drawing Sheets

AUTOMATED APPARATUS AND METHOD OF GENERATING NATIVE CODE FOR A STITCHING MACHINE

This invention was made under contract no. NAS1-20014 and NAS1-18862 awarded by NASA. The Government has certain rights to this invention.

BACKGROUND OF THE INVENTION

This invention relates to textile manufacturing. More specifically, this invention relates to stitching machines that are computer numerically controlled.

Large aircraft structures such as wing covers are now being fabricated from textile composites. The textile composites are attractive because of their potential for lowering the cost of fabricating the large aircraft structures. Cutting pieces of fabric and stitching the fabric pieces together have the potential of being less expensive then cutting sheets of aluminum, drilling holes in the aluminum sheets, removing excess metal and assembling metal fasteners.

The wing cover can be made from a carbon-fiber textile composite. Sheets of knitted carbon-fiber fabric are cut out into pieces having specified sizes and shapes. Fabric pieces having the size and shape of a wing are laid out first. Several of these pieces are stacked to form the wing cover. Additional pieces are stacked to provide added strength in high stress areas. After the fabric pieces are arranged in their proper positions, the pieces are stitched together to form a wing preform. Secondary details such as spar caps, stringers and intercostals are then stitched onto the wing preform. Such a wing preform might have a thickness varying between 0.05 inches and 1.5 inches. The wing preform is quite large, and its surface is very complex, usually a compound contoured three-dimensional surface.

The wing preform is transferred to an outer mold line tool that has the shape of an aircraft wing. Prior to the transfer, a surface of the outer mold line tool is covered with a congealed epoxy-resin. The tool and the stitched preform are placed in an autoclave. Under high pressure and temperature, the resin is infused into the stitched preform and cured. Resulting is a cured wing cover that is ready for assembly into a final wing structure.

The stitches are made by a computer numerically controlled (CNC) stitching machine. The stitching machine is programmed in a language that is native to CNC machines. On a wing preform, the stitching machine might make eight to ten stitches per inch in rows that might be spaced 0.1 inches to 0.5 inches apart over a surface that might be longer than forty feet and wider than eight feet. The total number of stitching points might exceed 1.5 million.

Generating code for the CNC stitching machine is slow, inefficient, and labor-intensive. At least one CNC instruction is generated for each stitching point on the wing preform. Even though CAD/CAM systems can automatically generate toolpaths, which constitute much of the code, the CAD/CAM systems do not generate all of the code. For example, the CAD/CAM systems do not generate code for avoiding constraints on the wing preform. Without that code, the stitching machine would attempt to stitch through stringers, spar caps and intercostals. Consequently, programmers must work off a geometric model of the wing cover (e.g., a loft surface), identify the constraints, sift through perhaps a million lines of CNC code, and insert appropriate instructions ensuring that the constraints are not violated.

Moreover, the CNC code must be generated by a person skilled in the art of programming CNC machines. However, each stitching machine might use codes that are unique to the stitching machine. Additionally, different programmers might take different approaches towards avoiding the constraints. The programmers can spend thousands of man-hours walking through millions of instruction codes, inserting additional instructions, and experimenting with their own routines for avoiding constraints, and testing the code.

Based on the foregoing, it can be appreciated that there exists a need for a faster, more efficient process for generating the CNC code. There also exists a need for a process that is less labor-intensive.

SUMMARY OF THE INVENTION

The invention can be regarded as a method of using a processor to generate native code for a CNC stitching machine including a stitching head. The method comprises the steps of providing stitching parameters to the processor; and providing geometric parameters including part geometry to the processor. After the parameters have been entered, the processor performs the following for each present stitching point. The processor determines the location of the next stitching point; looks for a constraint between the present stitching point and the next stitching point; generates code for making a stitch at the next stitching point when a constraint is not found; and generates code for changing a condition of the stitching head when a constraint is found, whereby the processor generates instructions for making the stitches and instructions for avoiding constraints.

BRIEF DESCRIPTION OF THE DRAWINGS

The above and other objects, features and advantages of the present invention will become apparent from the following detailed description taken in conjunction with the accompanying drawings, in which.

DETAILED DESCRIPTION OF THE PREFERRED EMBODIMENTS

While the present invention is described herein with reference to the illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
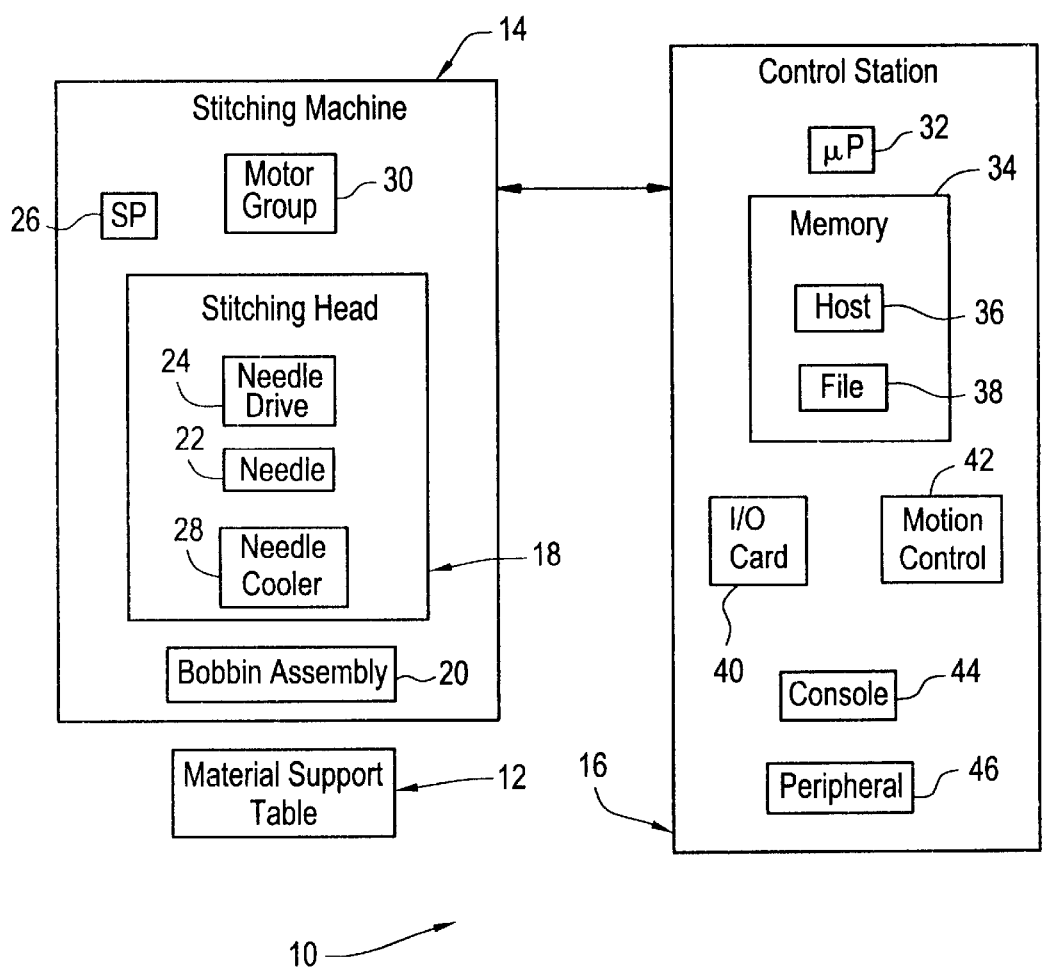
FIG. 1 is a block diagram of a stitching system.

FIG. 1 shows an automated stitching system 10 including a material support table 12, a stitching machine 14 and a control station 16. The material support table 12 provides a surface for supporting a preform. The surface of the material support table 12 can be tailored to the desired shape of the preform. For example, the material support table 12 can provide a flat two-dimensional surface, a contoured three-dimensional surface, or a compound, contoured three-dimensional surface.

The stitching machine 14 includes a stitching head 18, a spool 26 of thread and bobbin assembly 20 operable to make stitches at a plurality of stitching points on the preform. The stitching head 18 includes a needle 22, which is supplied thread by spool 26, and a needle drive mechanism 24 for reciprocating the needle. Additionally, the stitching head 18 might include means for performing unique functions, such means including a needle cooler 28 for automatically cooling the needle 22.

The stitching machine 14 further includes a motor group 30 for moving the stitching head 18 and bobbin assembly 20 to the stitching points. The motor group 30 includes a first servo-controlled motor for positioning the stitching head 18 and bobbin assembly 20 with respect to an x-axis and a second servo-controlled motor for positioning the stitching head 18 and bobbin assembly 20 with respect to a y-axis. The motor group 30 could also include a third servo-controlled motor for positioning the stitching head 18 and bobbin assembly 20 with respect to a z-axis, and a fourth servo-controlled motor for positioning the stitching head 18 and bobbin assembly 20 with respect to a rotational c-axis. The third and fourth servo-controlled motors would allow the stitching machine 14 to stitch a preform having a compound, contoured three-dimensional surface. Of course, the motor group 30 could include additional servo-controlled motors if additional degrees of freedom are desired.

Operation of the stitching head 18 and motor group 30 are controlled by the control station 16. The control station 16 controls the motor group 30 to move the stitching head 18 and bobbin assembly 20 to a stitching point on the preform. Then the control station 16 commands the needle drive mechanism 24 to plunge the needle 22 into the preform. The bobbin assembly 20, which is on the underside of the preform, grabs the needle thread and forms a loop. After the needle 22 is withdrawn from the preform, the control station 16 commands the motor group 30 to move the stitching head 18 and bobbin assembly 20 to the next stitching point. Once again, the needle 24 is plunged into the preform, the bobbin assembly 20 grabs the thread, forms another loop, and also locks a stitch. The control station 16 then commands the stitching machine 14 to make stitches at additional stitching points. At certain stitching points, the control station 16 might also command the needle cooler 28 to cool the needle 22.

The control station 16 includes a processor 32 and computer memory 34. Encoded in the computer memory 34 is a host program 36 and at least one file 38 including CNC instructions for making the stitches, controlling stitching speed, and cooling the needle 22. The processor 32 executes the host program 36, which instructs the processor 32 to fetch the CNC instructions from the file 38 and respond to the CNC instructions. When a CNC instruction is fetched, the processor 32 generates a command that is sent to an I/O card 40 or a motion controller card 42. When the I/O card 40 receives a command, it generates a control signal having an appropriate voltage level for an actuator such as solenoid. When the motion controller card 42 receives a command, it generates a control signal having a appropriate voltage level for an actuator such as a stepper motor. For example, the processor 32 fetches a CNC instruction for making a stitch, and sends position commands to the motion controller card 42. The motion controller card 42 sends control signals to the motor group 30. Or, the processor 32 fetches a CNC instruction for turning on needle cooling, and sends a command to the I/O card 40, which generates a control signal that turns on a solenoid actuator of the needle cooler 28.

The control station 16 further includes an operator console 44 including a display and keyboard for controlling the stitching machine 14, viewing stitching data, and viewing status and health of the stitching machine 14. A peripheral device 46 such as a floppy disk drive, CD ROM drive or tape drive allows the host program 36, and the file 38 to be loaded into the computer memory 34. In the alternative, the host program 36, the file 38 could be downloaded from a network. The file 38 could even be entered from the operator console 44.

Figure 2A:
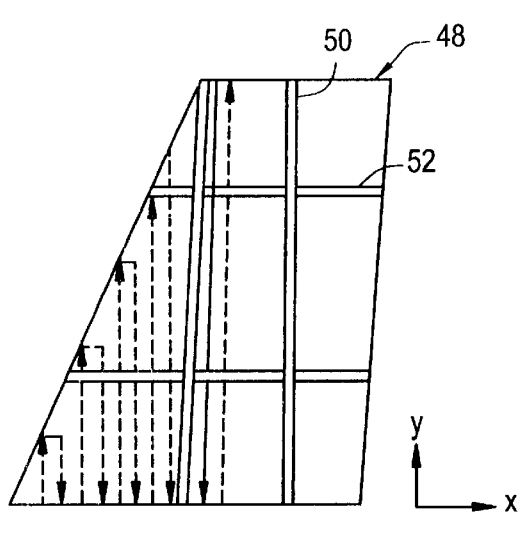
FIGS. 2a and 2b are schematic diagrams of toolpaths on a wing preform.
Figure 2B:
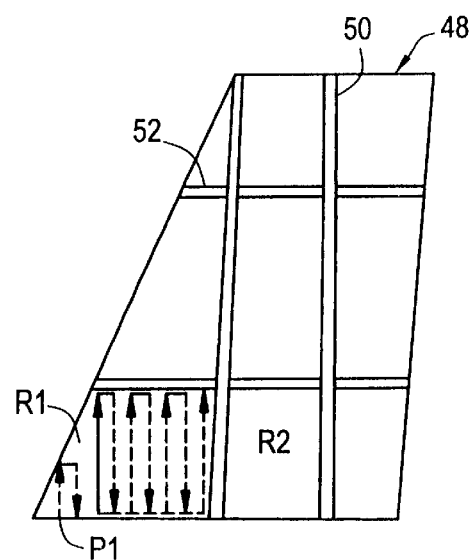

FIGS. 2a and 2b show two different toolpaths on a wing preform 48 having a flat, two-dimensional surface, with stringers 50 extending in a y-direction and intercostals 52 extending in an x-direction. Such a preform 48 is provided merely to facilitate an understanding of the invention; in reality, the wing preform 48 has a contoured, compound three-dimensional surface. Constraints on the preform 48 are imposed by the stringers 50 and intercostals 52. Therefore, the stitching machine 14 cannot stitch through the stringers 50 and intercostals 52. Instead, the stitching machine 14 must avoid these constraints.

When the stitching machine 14 encounters a stringer 50 or intercostal 52, it can jump the stringer 50 or intercostal 52 and continue stitching (see FIG. 2a). For example, the stitching machine 14 makes stitches until it reaches the leading side of an intercostal 52, raises the stitching head 18 so as not to hit the intercostal 52, lowers the stitching head 18 on the trailing side of the intercostal 52, and continues making stitches.

In the alternative, the stitching machine 14 can change directions of the stitching head 18 when a stringer 50 or intercostal 52 is encountered (see FIG. 2b). For example, the stitching machine 14 starts at a point P1, moves the stitching head 18 in the y-direction until it encounters an intercostal 52 extending in the x-direction. Then the stitching machine 14 changes the direction of the stitching head 18, now moving the stitching head 18 in the x-direction for at least one stitch unless encountering a stringer 50 extending in the y-direction. If a stringer 50 is encountered, the region R1 is full and the stitching machine 14 moves the stitching head 18 to another region R2 and begins stitching that region. If the stringer 50 is not encountered, the stitching machine 14 completes the x-direction stitch, then changes the direction of the stitching head 18 so that it proceeds in a direction opposite of the previous y-direction until it encounters a lower intercostal or boundary of the preform. When the stitching head 18 encounters a stringer 50, the stitching machine 14 changes the direction of the stitching head 18 once again, now moving the stitching head 18 in the y-direction. The stitching machine 14 continues changing directions until a region R1 defined by the stringers 50 and intercostals 52 has been stitched. Then the stitching machine 14 moves the stitching head 18 to another region R2 and begins stitching that region R2.

Figure 3:
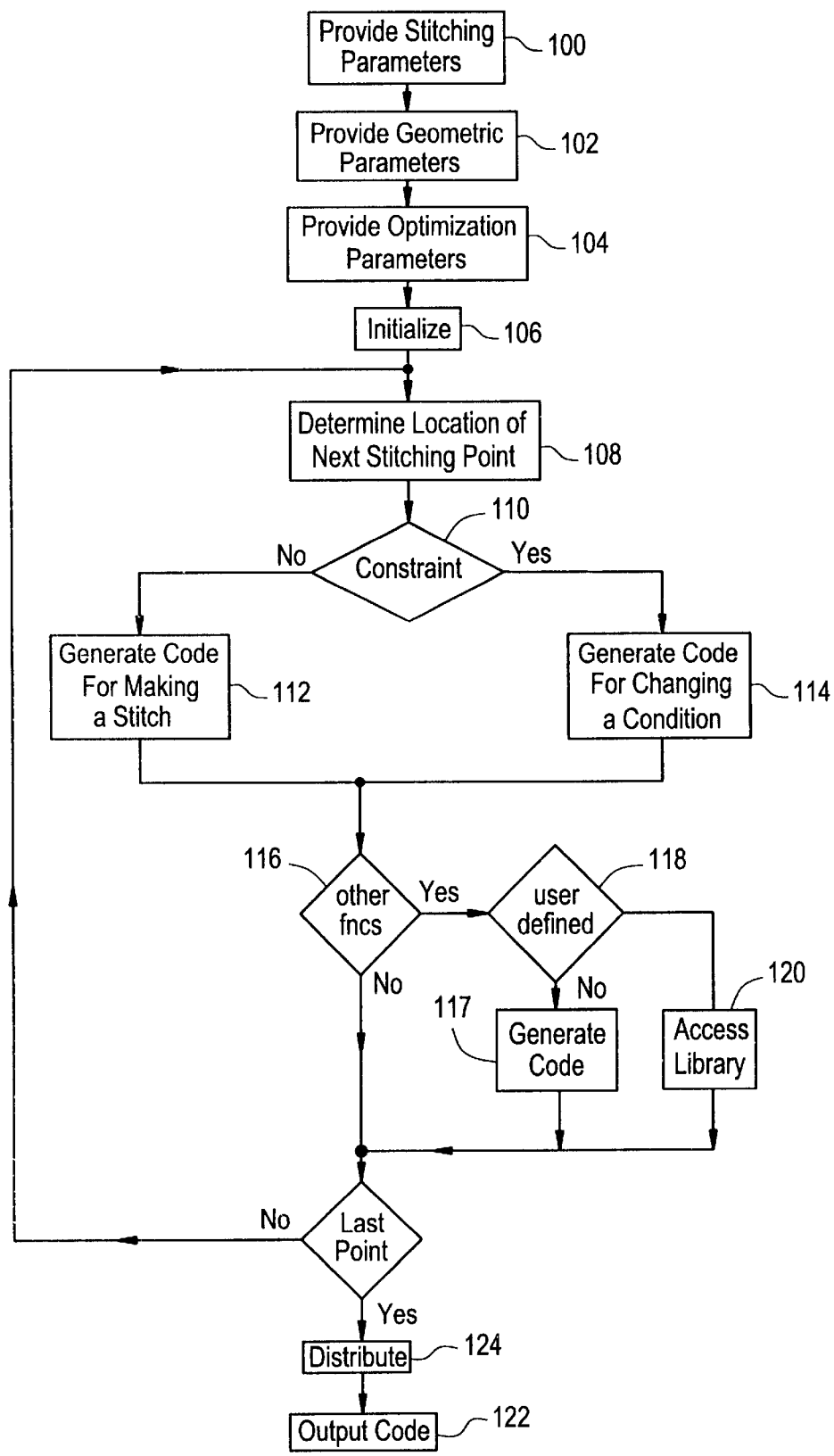
FIG. 3 is a flowchart of a method of generating native code for the stitching system.

FIG. 3 shows a method of using a processor to generate CNC code including instructions for making the stitches and instructions for avoiding the constraints. At step 100, stitching parameters are provided to the processor. The stitching parameters can include pitch of the stitches, row spacing and stitching speed. The processor can prompt the operators for the stitching parameters, or the processor can be programmed with the stitching parameters.

At step 102, geometric parameters are provided to the processor. The geometric parameters include part geometry (e.g., loft surface boundaries) and part constraints (e.g., stringer details, intercostal details, spar cap details). The geometric parameters could be provided to the processor from a file defining the surfaces of the part. The file can be generated by commercially available CAD software and saved in a neutral format such as "IGES," "STEP PDS" or "DXF." In the alternative, the processor could be programmed with a mathematical model of the part. For example, the processor could be programmed with a polynomial equation that describes the surface of the part.

If the stitching machine has multiple heads, optimization parameters are also provided to the processor (step 104). The optimization parameters specify which of the stitching heads will be used for stitching the preform. If, for example, one of the stitching heads is not functional, the optimization parameters specify that instructions should not be distributed to that non-functional stitching head.

After the parameters have been entered, the processor selects a starting path, selects a starting point on the part, and generates code for unparking the stitching head and bobbin assembly and moving the stitching head 18 to the first point (step 106). Then the processor performs the following steps for each present stitching point. The processor determines the location of the next stitching point (step 108); looks for a constraint between the present stitching point and the next stitching point (step 110); generates code for making a stitch at the next stitching point when a constraint is not found (step 112); and generates code for changing the condition of the stitching head when a constraint is found (step 114). The constraint could be avoided either by generating code for retracting the stitching head or by generating code for changing the direction of stitching.

The next stitching point is typically adjacent the present stitching point. The processor determines the location of the next stitching point based on the stitching parameters (pitch and row spacing).

Runtime of the processor can be reduced by reducing the frequency with which the processor looks for constraints. The processor can jump several stitching points between the next stitching point and the present stitching point, and look for a constraint. If a constraint is not found, the processor generates a code for making a stitch at each of the intermediate stitching points.

If other functions are required during the stitching process (step 116), the processor generates the codes (step 117). If the other functions are user-defined (step 118), such as needle cooling, the processor accesses a the code from a user-defined library (step 120).

The CNC code can be output as it is being generated, or it can be stored in a scratch file (step 122).

Again, if the stitching machine has multiple heads, the processor might also distribute the instructions among the multiple stitching heads (step 124). One stitching head might be responsible for stitching one region, while an adjacent stitching head might be responsible for stitching an adjacent region. The distribution is based, in part, on the optimization parameters. The optimization parameters might instruct a stitching machine having four stitching heads to use only two stitching heads for making the stitches.

Figure 4:
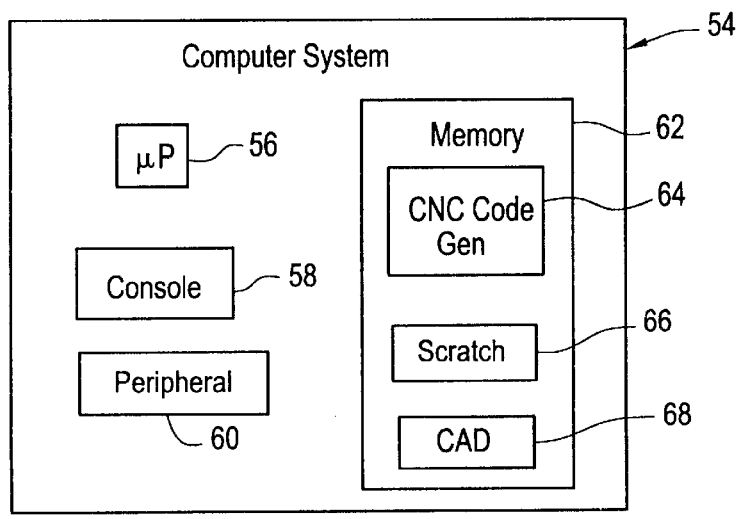
FIG. 4 is a block diagram of apparatus for generating the native code.

FIG. 4 shows a computer system 54 for generating the CNC code. The computer system 54 includes a processor 56, a console 58, a peripheral device 60 and memory 62. Stored in the memory 62 is a CNC code-generation program 64, which instructs the processor 56 to execute the steps described above in connection with FIG. 3; and the scratch file 66, which can store the CNC code generated by the CNC code-generation program 64. Also stored in the memory 62 is commercially available CAD software 68 for generating the geometry part file. The CNC code-generation program 64 and the CAD software 68 can be stored for distribution on articles such as CD ROMS and loaded into the memory 62 via a peripheral device 60 such as a CD ROM drive. In the alternative, the CNC code-generation program 64 and the CAD software 68 can be loaded directly into memory 62 via a network. The computer system 54 could be a personal computer, a workstation or a mainframe.

Thus disclosed is an invention that generates native code quickly and efficiently. The invention generates codes according to a rule-based system. It takes consistent actions when a constraint is encountered. Involvement of the programmers is reduced to a minimum.

In general, although a preferred embodiment of the present invention has been described in detail hereinabove, it should be clearly understood that many other variations and/or modifications of the basic inventive concepts herein taught which may appear to those skilled in the pertinent art will still fall within the spirit and scope of the present invention, as defined in the appended claims.

What is claimed is:

1. A method of using a processor to generate native code for a CNC stitching machine, the CNC machine including a stitching head, the method comprising the steps of:

providing stitching parameters to the processor;

providing geometric parameters of the surface of a part to be stitched to the processor, the geometric parameters including part geometry and part constraints; and using the processor to perform the following steps for each present stitching point:
determine the location of the next stitching point;
look for a constraint between the present stitching point and the next stitching point;
generate code for making a stitch at the next stitching point when a constraint is not found; and
generate code for changing a condition of the stitching head when a constraint is found;

whereby the processor generates instructions for making the stitches and instructions for avoiding the constraints.

2. The method of claim 1, wherein next stitching point is adjacent to present stitching point.

3. The method of claim 1, wherein next stitching point and the present stitching point separated by a plurality of intermediate stitching points, and wherein the processor generates multiple codes for making the stitches at the plurality of intermediate stitching points when a constraint is not found.

4. The method of claim 1, wherein the processor generates code for retracting the stitching head when a constraint is found.

5. The method of claim 1, wherein the processor generates code for changing direction of the stitching head when a constraint is found.

6. The method of claim 1, wherein the processor accesses user-defined codes for unique functions performed by the stitching head machine, the user-defined codes being accessed from a user-defined library.

7. The method of claim 1, wherein the stitching machine includes at least one additional stitching head, whereby the stitching machine includes multiple heads, and wherein the method further comprises the step of distributing the instructions among the multiple heads.

8. The method of claim 7, wherein at least one of the Dart constraints is selected from the group consisting of stringer information, intercostal information, and spar cap information, and wherein the part geometry includes surface boundaries information.

9. The method of claim 1, wherein the processor outputs the code as the code is being generated.

10. The method of claim 1, wherein the processor outputs the codes to a scratch file.

11. Apparatus for generating CNC code for a stitching machine, the stitching machine having at least one stitching head, the apparatus comprising:

a processor; and computer memory encoded with data for instructing the processor to access stitching parameters; access providing geometric parameters of the surface of a part to be stitched including part geometry and part constraints; and perform the following for each present stitching point:

determine the location of the next stitching point;

look for a constraint between the present stitching point and the next stitching point;

generate code for making a stitch at the next stitching point when a constraint is not found; and generate code for changing a condition of the stitching head when a constraint is found;

whereby the processor generates instructions for making the stitches and instructions for avoiding the constraints.

12. The apparatus of claim 11, wherein the encoded data instructs the processor to determine the next stitching point by identifying a stitching point adjacent to the present stitching point, and wherein at least one of the part constraints is selected from the group consisting of stringer information, intercostal information, and sear cap information, and wherein the part geometry includes surface boundaries information.

13. The apparatus of claim 11, wherein the encoded data instructs the processor to determine the next stitching point by identifying a stitching point separated by a plurality of intermediate stitching points, and wherein the encoded data further instructs the processor to generates multiple codes for making the stitches at the plurality of intermediate stitching points when a constraint is not found.

14. The apparatus of claim 11, wherein the encoded data instructs the processor to generate code for retracting the stitching head when a constraint is found.

15. The apparatus of claim 11, wherein the encoded data instructs the processor to generate code for changing direction of the stitching head when a constraint is found.

16. The apparatus of claim 11, wherein the memory is further encoded with data defining a library of user-defined CNC code for performing unique functions; and wherein the encoded data further instructs the processor to selectively access the user-defined CNC code from the library when a unique function is to be performed.

17. The apparatus of claim 11, wherein the stitching machine has at least one additional stitching head, whereby the stitching machine includes multiple heads, and wherein the encoded data further instructs the processor to distribute the code among the multiple heads.

18. An article of manufacture comprising:

computer memory; and data encoded in the computer memory, the data, when executed, instructing a computer to access stitching parameters; access providing geometric parameters of the surface of a part to be stitched including part geometry and part constraints; and perform the following for each present stitching point:

determine the location of the next stitching point;

look for a constraint between the present stitching point and the next stitching point;

generate code for making a stitch at the next stitching point when a constraint is not found; and generate code for changing a condition of the stitching head when a constraint is found;

whereby the computer generates instructions for making the stitches and instructions for avoiding the constraints.

19. The article of claim 18, wherein the encoded data instructs the computer to determine the next stitching point by identifying a stitching point adjacent to the present stitching point, and wherein at least one of the part constraints is selected from the croup consisting of stringer information, intercostal information, and spar cap information, and wherein the part geometry includes surface boundaries information.

20. The article of claim 18, wherein the encoded data instructs the computer to determine the next stitching point by identifying a stitching point separated by a plurality of intermediate stitching points, and wherein the encoded data further instructs the processor to generates multiple codes for making the stitches at the plurality of intermediate stitching points when a constraint is not found.

21. The article of claim 18, wherein the encoded data instructs the computer to generate code for retracting the stitching head when a constraint is found.

22. The article of claim 18, wherein the encoded data instructs the computer to generate code for changing direction of the stitching head when a constraint is found.

* * * * *